C. T. HENDERSON.
DRIVING MECHANISM.
APPLICATION FILED MAY 13, 1914.
1,157,307.
Patented Oct. 19, 1915.
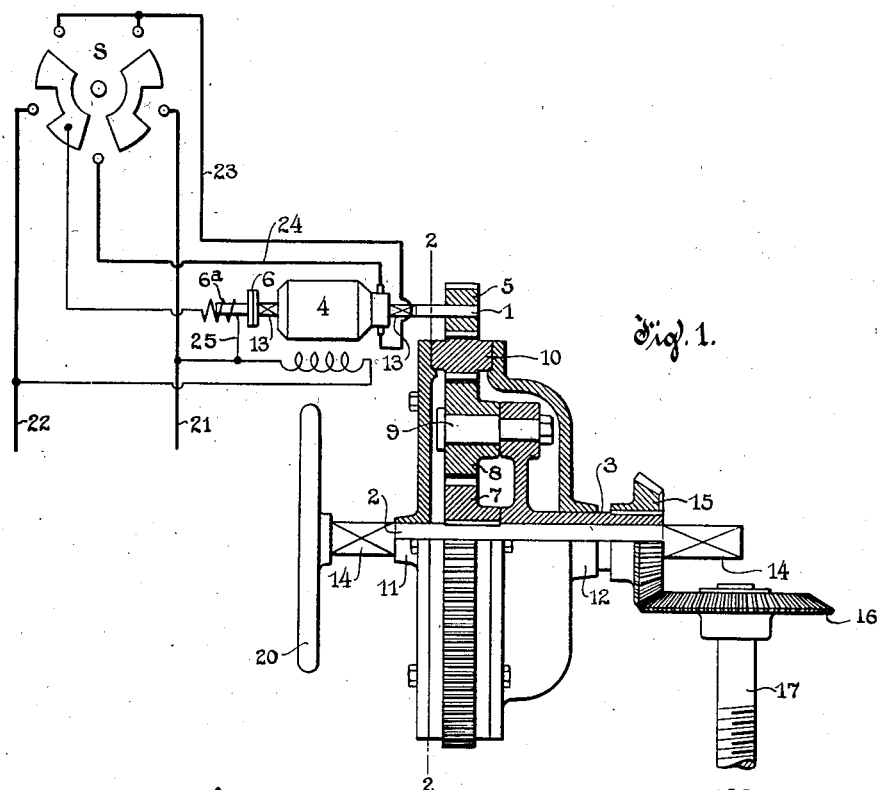
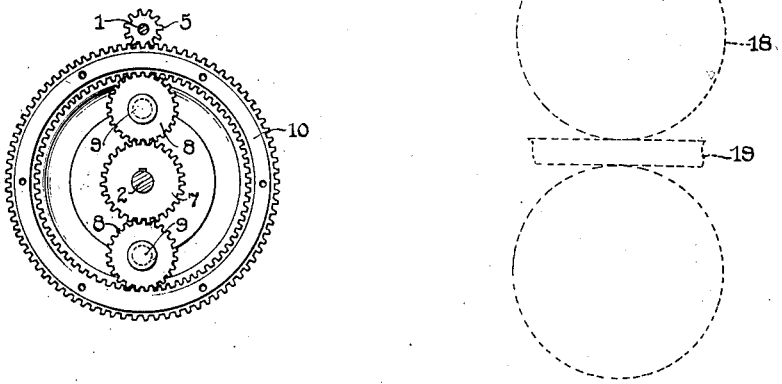
Witnesses
J. L. Johnson
H. Watson
Inventor
Clark T. Henderson
By Frank H. Hubbard
Attorney

UNITED STATES PATENT OFFICE.

CLARK T. HENDERSON, OF MILWAUKEE, WISCONSIN, ASSIGNOR TO THE CUTLER-HAMMER MFG. CO., OF MILWAUKEE, WISCONSIN, A CORPORATION OF WISCONSIN.

DRIVING MECHANISM.

1,157,307.     Specification of Letters Patent.     Patented Oct. 19, 1915.

Application filed May 13, 1914. Serial No. 838,408.

*To all whom it may concern:*

Be it known that I, CLARK T. HENDERSON, a citizen of the United States, residing at Milwaukee, in the county of Milwaukee and State of Wisconsin, have invented new and useful Improvements in Driving Mechanisms, of which the following is a full, clear, concise, and exact description, reference being had to the accompanying drawing, forming a part of this specification.

This invention relates to driving mechanisms and is particularly applicable to driving mechanisms employed for adjustment purposes.

In many classes of apparatus, as for example, screw downs for rolling mills, it is necessary to make frequent adjustments to effect engagement between movable and rigid parts. Moreover, the range of such adjustments often varies, and when comparatively large, it is desirable to move the adjustable parts quickly. Heretofore, much difficulty has been encountered in attaining the desired rapid adjustments without undue impact between the engaging parts.

This invention has among its objects to provide an improved driving mechanism particularly advantageous for use where the aforesaid conditions obtain.

Other objects and advantages will appear hereinafter.

The accompanying drawing illustrates a preferred embodiment of the invention as employed for operating a screw down for a rolling mill.

Figure 1 is a side view, partially in section, of a driving mechanism with a schematic representation of a pair of mill rolls; and Fig. 2 is a sectional view on the line 2—2 of Fig. 1.

In general, the driving mechanism illustrated comprises a power operated driving member 1, a hand-operated driving member 2, a common driven member 3 and interposed gearing whereby the braking of either driving member enables a drive through the medium of the other and whereby the power transmitted by the shaft 1 can not exceed the manual force by which the shaft 2 is braked.

The member 1 is driven by a motor 4 and as shown, comprises the armature shaft thereof. This shaft carries a fixed pinion 5 and has associated therewith an electrical braking device 6 comprising a non-rotatable part normally engaging a part associated with the shaft 1 for restraining the latter but movable to release the same by an electro-responsive winding $6^a$, energization of which is insured while the motor 4 is running. The braking device 6 is thus adapted to release the shaft 1 for rotation only when the motor is in operation. A suitable switch S is provided to control the continuity of circuit to, and the direction of operation of, the motor and to control circuit to the brake winding $6^a$. The other driving member 2 is alined with, and preferably journaled through, the driven member 3 and carries keyed thereon a pinion 7 in constant mesh with a pair of epicyclic gears 8 loosely journaled on offset studs 9 of the driven member. A loose casing 10 incloses the gears 8 and the driving pinion 7 and is provided with bearings 11 and 12 on the driving and driven shafts respectively. Suitable bearings 13 and 14 are also provided for the shafts 1 and 2. The casing 10 is toothed internally to mesh with the gears 8 and is toothed externally to mesh with the motor driven pinion 5.

The driven sleeve 3 is provided with a fixed gear 15 through which power may be transmitted. In the form shown this gear is beveled and meshes with a similar gear 16 keyed to a threaded shaft 17 which latter works in a suitable frame to adjust one of the mill rolls 18 in conformity with the thickness of a bar 19.

For effecting adjustment of the mill rolls through wide degrees, the driven member 3 is designed to be connected with the power shaft 1, while for obtaining nicer adjustments through shorter distances the hand-operated driven shaft is designed to be employed. The speed ratio of the hand drive connection is preferably relatively low with respect to the ratio of the power drive.

Assuming that the driven member 3 is to be operated at slow speed or through a small adjustment the hand wheel 20 is rotated, for example, in a clockwise direction. The gears 8 are then rotated in counter-clockwise directions on their studs 9 and bodily move the driven shaft 3 in the same direction as the driving shaft. It is to be understood that during operation of the hand wheel the casing 10 is locked against movement by engagement with the motor pinion 5 which is, as above set forth, positively held by the braking device 6. Rotation of the hand wheel 20 in the opposite direction effects a reverse rotation of the driven shaft, as will be apparent. It is also apparent that exceedingly accurate adjustments of the mill roll may be readily obtained by means of the manual drive. When, however, it is desired to raise or lower the roll 18 through a greater distance, a power drive connection is established for the driven member whereby such adjustments may be accomplished without excessive effort or delay. For example, if it is desired to lower the roll 18 the switch S is closed to rotate the armature shaft 1 in a clockwise direction. The hand wheel 20 is simultaneously grasped by the operator and manually restrained against movement. The casing 10 is thereupon rotated in a counter clockwise direction and carries therewith at reduced velocity the gears 8 which mesh with the now stationary pinion 7. The driven sleeve 3 and pinion 15 accordingly turn the threaded shaft 17 to rapidly lower the mill roll. When, however, the roll comes into engagement with the rolled material 19 an increased load is immediately placed upon the driven member 3 with a consequent increased torque on the pinion 7 which overcomes the manual braking force exerted on the hand wheel 20 thereby freeing the shaft 2 to release the driven shaft from the power driving shaft. Thus the power exerted upon the driven member by the motor is dependent upon the force with which the shaft 2 is manually braked with the obvious result of protecting the parts against undue impact and strain when the movable part or parts strike the rigid part or parts.

The circuit arrangement shown for the motor is simple and clear. The motor field is connected across the lines 21 and 22. The armature circuit is controlled by the switch S and may be traced, when the switch is in one position, from the line 21, through the switch, along conductors 23, 24 and through the other side of the switch to the line 22. The brake winding circuit is simultaneously established from line 21 by conductor 25 through the switch to line 22. When the switch is moved to opposite position the armature circuit may be traced from line 21 through the switch, along conductors 24 and 23, and thence through the other side of the switch to the line 22. It will thus be apparent that when switch S is moved to complete circuit to the motor 4 for operating the same in either direction, circuit is simultaneously completed to winding 6ª which accordingly attracts the armature member of brake 6 and releases shaft 1.

What I claim as new and desire to secure by Letters Patent is:—

1. The combination with a member to be power operated, of power transmitting gearing therefor including a normally free gear having a manual restraining device associated therewith to effect and limit power transmission to said member, said gear and said device being movable together and forcibly freed from manual restraint upon obstruction of movement of said member for abruptly terminating power transmission thereto.

2. The combination with a member to be power operated, of power transmitting gearing therefor including a normally free gear having a hand grip rotatable therewith, said gear being restrainable by manual restraint of said hand grip for effecting power transmission to said member proportional to such manual restraining force.

3. The combination with a member to be power operated, of power transmitting gearing therefor including a gear normally free to receive the power and a hand grip rotatable with said gear to be manually restrained for thereby diverting the power to said member and to be forcibly released from manual restraint upon obstruction of movement of said member for abruptly restoring the power to said gear.

4. In combination, a driven member and means for effecting a power drive thereof, said means including a braked member adapted to slip for limiting the force exerted on said driven member by said means and capable of manual operation to drive said driven member.

5. In combination, a power driving member, a member to be driven, a train of constantly meshing gears between said members including a normally free gear capable of manual restraint to establish the power driving connection to said member to be driven, and to maintain said connection only while the force required to drive said member to be driven does not exceed a predetermined proportion of the restraining effort exerted on said free member, said gear being also capable of manual operation to drive said member to be driven.

6. In combination, a power driving member, a member to be driven thereby, and a gear train interposed between said members including a normally free member which must be braked to effect the power drive of said member to be driven and which itself becomes the driven member when the force required to drive said member to be driven exceeds a predetermined proportion of the restraining effort exerted on said free member and said free member being capable of independent operation to drive said member to be driven.

7. In combination, a driven member, and means for establishing a power drive thereof including a manually braked member subservient to and inherently freed by an excess load on said driven member to render ineffective the power drive thereof.

8. In combination, a driven member, and means for effecting a power drive thereof, said means including a manually braked gear adapted to be freed for rendering said power drive ineffective and adapted to be manually operated to drive said driven member.

9. In combination, a driven member to be adjusted, a power driver therefor and means for effecting wide adjustments of said member by said power driver, said means including a manually controllable member for effecting slight adjustments of said driven member and for limiting the adjustments of the latter by said power driver.

10. In combination, a driven member, a driving member therefor, and an interposed gearing including a loose member adapted to be braked to establish a driving connection between said driving and driven members and to be freed in response to the load on said driven member to render said driving connection ineffective and to be manually operated to drive said driven member.

11. In combination, a driven member, a power driver therefor, a manual driver therefor, transmission gearing between said drivers and said member including constantly meshing gears common to the power and manual drive of said member, and means to brake one of said gears independently of the remainder.

12. In combination, a pair of driving shafts, a pinion on each, a driven shaft, an offset gear thereon meshing with one of said driving pinions, a loose gear meshing interiorly with said driven gear and exteriorly with the other of said driving pinions and separate means to brake said driving shafts independently.

In witness whereof, I have hereunto subscribed my name in the presence of two witnesses.

CLARK T. HENDERSON.

Witnesses:
L. A. WATSON,
TEKLA BAST.